Jan. 30, 1923. 1,443,767
C. S. STAFFORD.
GLASS AND OTHER FURNACE.
FILED MAR. 28, 1922.
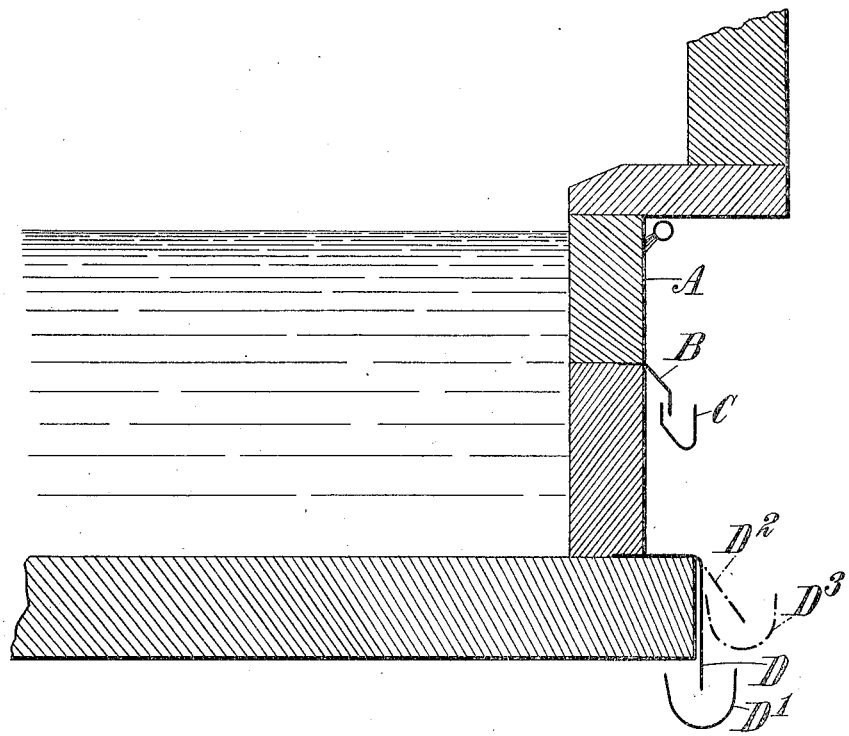
Inventor.
Charles S. Stafford,
By Watson, Coit, Morse & Grindle,
Attorneys.

Patented Jan. 30, 1923.

1,443,767

UNITED STATES PATENT OFFICE.

CHARLES STAFFORD STAFFORD, OF LONDON, ENGLAND.

GLASS AND OTHER FURNACE.

Application filed March 28, 1922. Serial No. 547,475.

*To all whom it may concern:*

Be it known that I, CHARLES STAFFORD STAFFORD, a subject of the King of England, residing at London, England, have invented certain new and useful Improvements in Glass and Other Furnaces, of which the following is a specification.

This invention is for improvements in or relating to glass and other furnaces and has for its object to provide means whereby furnaces composed of refractory material and subject to erosion at high temperatures may be more satisfactorily cooled than is possible with present methods and the life of the furnace thereby prolonged.

Glass furnaces as at present constructed are built of blocks of refractory material and erosion takes place rapidly at about the level of the glass within the furnace because at the temperature of the molten glass the material of which the furnace is made is gradually absorbed into the glass, whereas if the furnace walls can be sufficiently cooled without chilling the glass in contact with them the rate of erosion would be greatly decreased.

It has been proposed to cool the wall of the furnace by spraying water or steam directly on to the same, but this is found to weaken the blocks and also the saturation resulting causes devitrification of the glass. To avoid this metal plates or tanks have been placed against the furnace to receive the spray or cooling water but it is impossible to get these in sufficiently close contact with the wall of the furnace to make them efficient as the temperatures to which they are exposed causes them to buckle with the result that the desired intimate contact is lost; moreover, the use of plates or tanks militates against the easy access to the furnace walls for the purpose of repairs.

According to the present invention the exterior face or portion of such face of the wall of the furnace of refractory material, or those faces of the blocks which are to be outermost when built into the wall, are sprayed with water-proofing material such as shall not be destroyed by the heat of the furnace so that the cooling-medium may be applied directly to this prepared face of the furnace without damage. The water-proofing material may take the form of molten metal, such as brass, so that in addition to water-proofing a skin of material, constituting a good heat conductor, is provided, or other water-proofing materials, such as vitreous enamel or a substance similar to that which is used for glazing pottery may be used.

The molten metal may be sprayed on by known apparatus, which requires no description in the present specification, and similar apparatus could be used for spraying the vitreous enamel or glazing composition. But with metal is is preferable to use an oxyhydrogen burner for spraying purposes rather than acetylene as the latter gas is found to produce a somewhat porous surface in the metal.

Where the blocks are sprayed prior to building into the furnace the joints would have to be separately sprayed after such building in had been effected.

In the accompanying drawing which shows diagrammatically a section through part of a wall of a glass furnace, the row of blocks which are specially liable to erosion is indicated at A, and these are the blocks which would be coated with water-proofing material. A drip-plate B may be provided at the bottom joint of the row to discharge the water, which will accumulate on the face of the blocks, into a gutter C, or such drip-plate could be placed at the bottom of the furnace, as indicated at D, and drain into a gutter $D^1$ or be sloped out as shown in chain line at $D^2$ to drain into a gutter indicated in chain line at $D^3$.

Obviously, the invention is not restricted to spraying the course of blocks A with water-proofing material, as any part of the furnace may be treated in this manner where it is useful so to do.

To cool the furnace either water or steam may be sprayed on to the blocks which have been water-proofed, and thus the cooling-medium can be brought into intimate contact with the surfaces to be cooled without disintegration of the block forming the furnace walls or devitrifying of the glass, as such water or steam will act only on the surface and will not penetrate the blocks, whereas it has been found that when the blocks are sprayed without any such protective coating penetration of the block takes place to such an extent as to even drive small particles of the block from the inner face of the furnace into the glass; also, flaking is caused by minor explosions of steam pockets formed behind the inner surface of the furnace, which steam is caused to expand and break away the inner surface by the heat of the molten material within the furnace.

The invention is obviously applicable to any furnaces provided with a refractory material which needs to be cooled and wherein spraying of water or steam can be applied, for example, steel furnaces could be treated in this manner.

Before spraying the metal or other water-proofing material on to the blocks or furnace wall the surface to be sprayed may be rendered less porous by applying a thin coat of a non-shrinking cement having approximately the same co-efficient of expansion as the blocks. Such a cement may consist of 60% grog (burned fireclay) 38% fireclay and 2% sodium silicate all ground very fine and thoroughly mixed before applying.

Although it has been proposed to spray the water-proofing material on to the blocks, it will be appreciated that it can be applied by other means where the material is such as to lend itself to other treatment.

I claim:—

1. For a refractory furnace, blocks of refractory material having those faces which are to be outermost, treated with water-proofing material, such as shall not be destroyed by the heat of the furnace, so that a cooling medium may be applied directly to such faces without resulting deterioration.

2. For a refractory furnace, blocks of refractory material having those faces which are to be outermost coated with a layer of metal caused to adhere thereto for the purpose of water-proofing the said faces so that a cooling-medium can be applied directly thereto and providing a skin of material which is a good heat conductor to assist rapid dispersion of the heat.

3. For a refractory furnace, blocks of refractory material having those faces which are to be outermost, covered with water-proofing material in the form of molten metal sprayed on to the said faces for the purpose of water-proofing the said faces so that a cooling medium can be applied directly thereto and providing a skin of material which is a good heat conductor to assist rapid dispersion of the heat.

4. For a refractory furnace, blocks of refractory material having those faces which are to be outermost sprayed with a water-proofing material such as shall not be destroyed by the heat of the furnace or by the application of a cooling medium, so that the said cooling medium may be applied directly to these prepared faces without resulting deterioration of said faces.

5. For a refractory furnace, blocks of refractory material having those faces which are to be outermost filled in with a finely ground cement to render them smooth and then sprayed with a water-proofing material such as shall not be destroyed by the heat of the furnace or by the application of a cooling medium directly thereto.

6. A refractory furnace wherein the outer faces of the walls requiring to be cooled are treated with water-proofing material, such as shall not be destroyed by the heat of the furnace, so that a cooling medium may be applied directly to such faces without resulting deterioration.

7. A refractory furnace wherein the outer faces of the walls requiring to be cooled are coated with a layer of metal caused to adhere thereto for the purpose of water-proofing the said faces so that a cooling-medium can be applied directly thereto and providing a skin of material which is a good heat conductor to assist rapid dispersion of the heat.

8. A refractory furnace wherein the outer faces of the walls requiring to be cooled are covered with water-proofing material in the form of molten metal sprayed on to the said faces for the purpose of water-proofing the said faces so that a cooling-medium can be applied directly thereto and providing a skin of material which is a good heat conductor to assist rapid dispersion of the heat.

9. A refractory furnace wherein the outer faces of the walls requiring to be cooled are sprayed with a water-proofing material such as shall not be destroyed by the heat of the furnace or by the application of a cooling-medium so that the said cooling-medium may be applied directly to these prepared faces without resulting deterioration of said faces.

10. A refractory furnace wherein the outer faces of the walls requiring to be cooled are filled in with a finely ground cement to render them smooth and then sprayed with a water-proofing material such as shall not be destroyed by the heat of the furnace or by the application of a cooling-medium directly thereto.

In testimony whereof I affix my signature.

CHARLES STAFFORD STAFFORD.